United States Patent
Tang

(10) Patent No.: US 12,373,975 B2
(45) Date of Patent: Jul. 29, 2025

(54) ROCK CRACK INFORMATION IDENTIFICATION METHOD AND SYSTEM BASED ON VARIATIONAL AUTOENCODER

(71) Applicant: TONGJI UNIVERSITY, Shanghai (CN)

(72) Inventor: Jizhou Tang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 323 days.

(21) Appl. No.: 18/203,489

(22) Filed: May 30, 2023

(65) Prior Publication Data
US 2023/0386069 A1 Nov. 30, 2023

(30) Foreign Application Priority Data
May 30, 2022 (CN) .......................... 202210595664.1

(51) Int. Cl.
| | |
|---|---|
| *G06T 7/62* | (2017.01) |
| *G01N 27/12* | (2006.01) |
| *G01N 27/20* | (2006.01) |
| *G06T 5/70* | (2024.01) |
| *G06T 7/10* | (2017.01) |

(52) U.S. Cl.
CPC .............. *G06T 7/62* (2017.01); *G01N 27/122* (2013.01); *G01N 27/20* (2013.01); *G06T 5/70* (2024.01); *G06T 7/10* (2017.01); *G06T 2200/21* (2013.01); *G06T 2207/10081* (2013.01); *G06T 2207/20081* (2013.01); *G06T 2207/30242* (2013.01)

(58) Field of Classification Search
CPC ........................................................ G06T 5/70
See application file for complete search history.

(56) References Cited

U.S. PATENT DOCUMENTS

| | | | | |
|---|---|---|---|---|
| 2010/0326669 A1* | 12/2010 | Zhu | .......................... | G01V 11/00 703/2 |
| 2013/0013209 A1* | 1/2013 | Zhu | .......................... | G01N 33/24 702/6 |
| 2017/0372470 A1* | 12/2017 | Liu | ............................ | G06T 7/60 |

* cited by examiner

*Primary Examiner* — Edward Park
(74) *Attorney, Agent, or Firm* — Kinney & Lange, P.A.

(57) ABSTRACT

The present disclosure pertains to a rock crack information identification method and system based on a variational autoencoder, and belongs to the technical field of rock mechanical fracturing tests in petroleum engineering. A micro-resistivity scanning imaging test and a computed tomography (CT) scanning test are performed on each rock specimen to obtain a two-dimensional micro-resistivity distribution image and a three-dimensional CT scanning image of the rock specimen for training, and an initial variational autoencoder is trained to obtain a trained variational autoencoder. In an actual application, a two-dimensional micro-resistivity distribution image of a rock to be tested is obtained first, and the three-dimensional CT scanning image is reconstructed by using the trained variational autoencoder, such that rock crack information of the rock to be tested is accurately determined with low costs.

10 Claims, 6 Drawing Sheets

Neural network structure of encoder:

Neural network structure of decoder:

ROCK CRACK INFORMATION IDENTIFICATION METHOD AND SYSTEM BASED ON VARIATIONAL AUTOENCODER

CROSS REFERENCE TO RELATED APPLICATION

This patent application claims the benefit and priority of Chinese Patent Application No. 202210595664.1, filed with the China National Intellectual Property Administration on May 30, 2022, the disclosure of which is incorporated by reference herein in its entirety as part of the present application.

TECHNICAL FIELD

The present disclosure pertains to the technical field of rock mechanical fracturing tests in petroleum engineering, specifically, a method and system for identifying rock crack information using a micro-resistivity scanning imaging technology and a deep learning variational autoencoder.

BACKGROUND

China possesses abundant unconventional oil and gas resources. Exploration and development of these resources play a vital role in addressing energy supply-demand imbalance and adjusting an energy structure. However, these resources exhibit poor physical properties, such as low permeability (less than $0.1 \times 10^{-3}$ µm$^2$) and porosity (less than 10%). Therefore, a hydraulic fracturing technology is usually used to stimulate a reservoir and improve oil and gas production efficiency. The stimulation effect of fracturing largely depends on an area reconstructed by hydraulic fracturing, that is, a stimulated reservoir volume (SRV). Therefore, understanding formation mechanism of complex crack networks is very important to accurately predicting the SRV.

Currently, to understand a law of fracture propagation and formation mechanism of complex crack networks, indoor experiments of hydraulic fracturing can be very helpful. In these experiments, it is necessary to monitor cracks in rock specimens. Nowadays, an acoustic emission technology and a computed tomography (CT) scanning technology are the main monitoring methods used. Although the two technologies are relatively developed, both technologies have limitations. For example, the acoustic emission technology cannot accurately locate the cracks in rocks, making it difficult to accurately describe rock crack information, such as a spatial position, a quantity, a trend, a length, and a width. In addition, to implement this technology, a large number of probes need to be disposed to record monitoring data, resulting in large data capacity, and time-consuming processing. Although the CT scanning technology can accurately obtain rock crack information, it is costly to implement a test.

Based on this, there is an urgent need for a lost-cost rock crack information identification method and system that can provide rock crack information accuracy similar to that obtained by the CT scanning technology.

SUMMARY

An objective of the present disclosure is to provide a rock crack information identification method and system based on a variational autoencoder, which enables accurate acquisition of rock crack information at low cost.

To achieve the above objective, the present disclosure provides the following technical solutions:

A rock crack information identification method based on a variational autoencoder includes:
obtaining a plurality of rock specimens;
for each rock specimen, performing a micro-resistivity scanning imaging test on the rock specimen by using a micro-resistivity scanning imaging test system, to obtain a two-dimensional micro-resistivity distribution image of the rock specimen for training; and performing a computed tomography (CT) scanning test on the rock specimen, to obtain a three-dimensional CT scanning image of the rock specimen for training;
training an initial variational autoencoder by using two-dimensional micro-resistivity distribution images and three-dimensional CT scanning images of all rock specimens as inputs, to obtain a trained variational autoencoder; and
performing the micro-resistivity scanning imaging test on a rock to be tested using the micro-resistivity scanning imaging test system, to obtain a two-dimensional micro-resistivity distribution image of the rock to be tested; reconstructing the three-dimensional CT scanning image by the trained variational autoencoder by using the two-dimensional micro-resistivity distribution image as an input; and determining, based on the three-dimensional CT scanning image, crack information of the rock to be tested, where the crack information includes a position, a quantity, a trend, a length, and a width of a crack.

A rock crack information identification system based on a variational autoencoder includes a training module and an identification module.

The training module is configured to: obtain a plurality of rock specimens; for each rock specimen, perform a micro-resistivity scanning imaging test on the rock specimen using a micro-resistivity scanning imaging test system, to obtain a two-dimensional micro-resistivity distribution image of the rock specimen; perform a computed tomography (CT) scanning test on the rock specimen, to obtain a three-dimensional CT scanning image of the rock specimen; and train an initial variational autoencoder by using two-dimensional micro-resistivity distribution images and three-dimensional CT scanning images of all rock specimens as inputs, to obtain a trained variational autoencoder.

The identification module is configured to: perform the micro-resistivity scanning imaging test on a rock to be tested using the micro-resistivity scanning imaging test system, to obtain a two-dimensional micro-resistivity distribution image of the rock to be tested; reconstruct the three-dimensional CT scanning image by the trained variational autoencoder by using the two-dimensional micro-resistivity distribution image as an input; and determine, based on the three-dimensional CT scanning image, crack information of the rock to be tested, where the crack information includes a position, a quantity, a trend, a length, and a width of a crack.

According to specific embodiments provided in the present disclosure, the present disclosure provides the following technical effects:

According to the rock crack information identification method and system based on a variational autoencoder provided in the present disclosure, the micro-resistivity scanning imaging test and the CT scanning test are performed on each of the rock specimens to obtain the two-dimensional micro-resistivity distribution image and the three-dimensional CT scanning image of the rock specimen, and the initial variational autoencoder is trained to obtain the trained variational autoencoder. In an actual application, the two-dimensional micro-resistivity distribution image of the rock to be tested is obtained first, and the three-dimensional CT scanning image is reconstructed by using the trained variational autoencoder, such that the rock crack information of the rock to be tested is accurately determined with low costs.

BRIEF DESCRIPTION OF THE DRAWINGS

To describe the technical solutions in embodiments of the present disclosure or in the prior art more clearly, the accompanying drawings required for embodiments are briefly described below. It should be noted that the accompanying drawings in the following description only show some embodiments of the present disclosure, and those of ordinary skill in the art can still derive other accompanying drawings without creative efforts.

REFERENCE NUMERALS

1—rock specimen; 2—polar plate; 3—fixing device; 4—LCR digital bridge tester; 5—electro-imaging processing component.

DETAILED DESCRIPTION OF THE EMBODIMENTS

The technical solutions of embodiments of the present disclosure are clearly and completely described below with reference to the accompanying drawings. It should be noted that the described embodiments are only a part rather than all of embodiments of the present disclosure. All other embodiments obtained by a person of ordinary skill in the art based on embodiments of the present disclosure without creative efforts shall fall within the protection scope of the present disclosure.

An objective of the present disclosure is to provide a rock crack information identification method and system that can obtain accurate rock crack information and accurately depict a crack formed in a rock during the fracturing test process, so that a structure can be simple, operations are convenient, and implementation costs are low.

To clarify and make the above objectives, features, and advantages of the present disclosure more comprehensible, the present disclosure will be further described in more detail below with reference to the accompanying drawings and the specific implementations.

Embodiment 1

Figure 1:
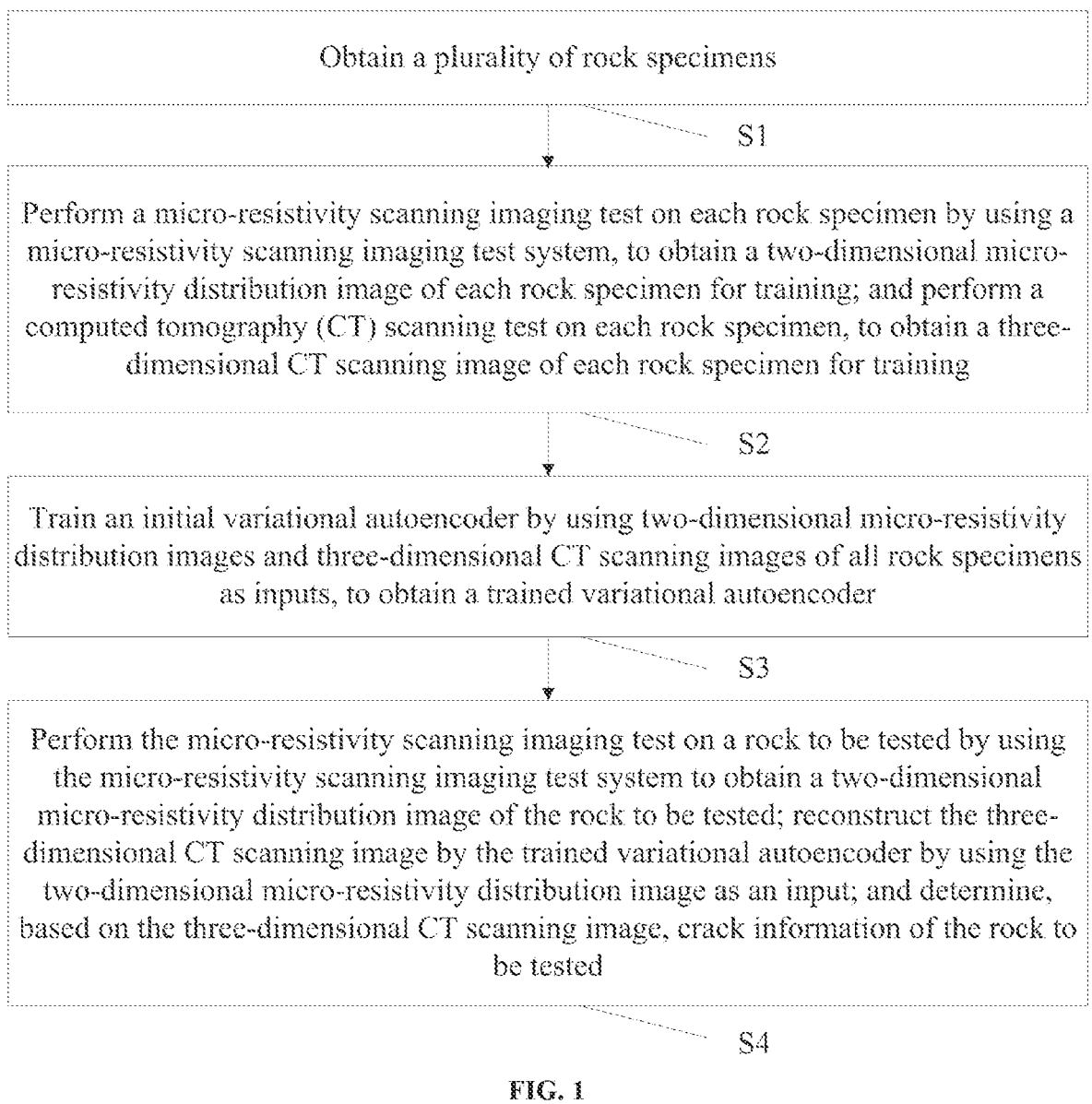
FIG. 1 is a flowchart of an identification method provided by an Embodiment 1 of the present disclosure.
Figure 2:
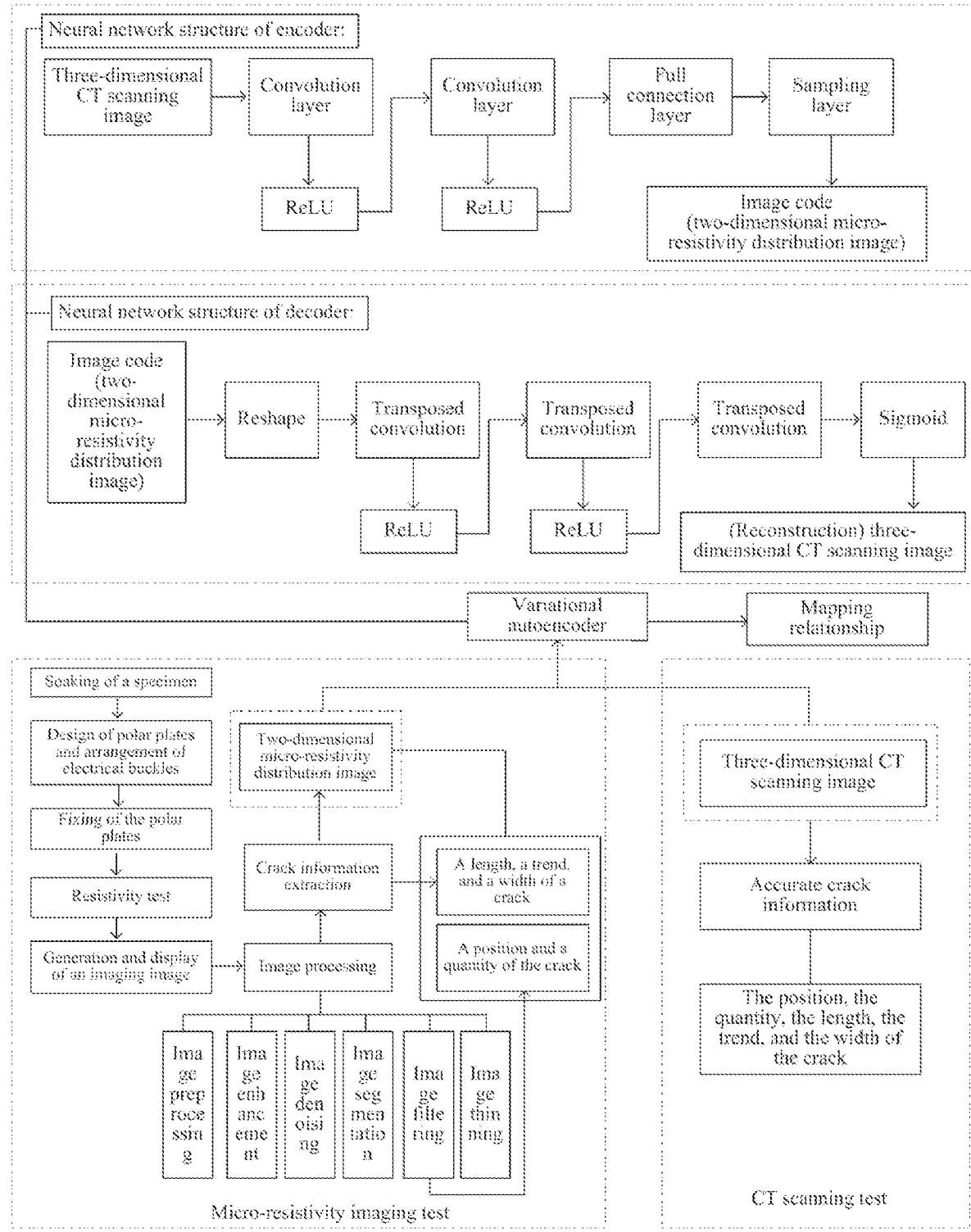
FIG. 2 is a technical route of an identification method provided by an Embodiment 1 of the present disclosure.

A rock crack information identification method based on a variational autoencoder is provided in this embodiment. As shown in FIG. 1 and FIG. 2, the identification method includes the following steps:

S1: Obtain a plurality of rock specimens.

The rock specimen in this embodiment may be a cuboid or a cube, preferably a cube, with a dimension of 100 mm×100 mm×100 mm.

S2: Perform a micro-resistivity scanning imaging test on each rock specimen by using a micro-resistivity scanning imaging test system, to obtain a two-dimensional micro-resistivity distribution image of the rock specimen for training; and perform a computed tomography (CT) scanning test on each rock specimen, to obtain a three-dimensional CT scanning image of each rock specimen for training.

Figure 3:
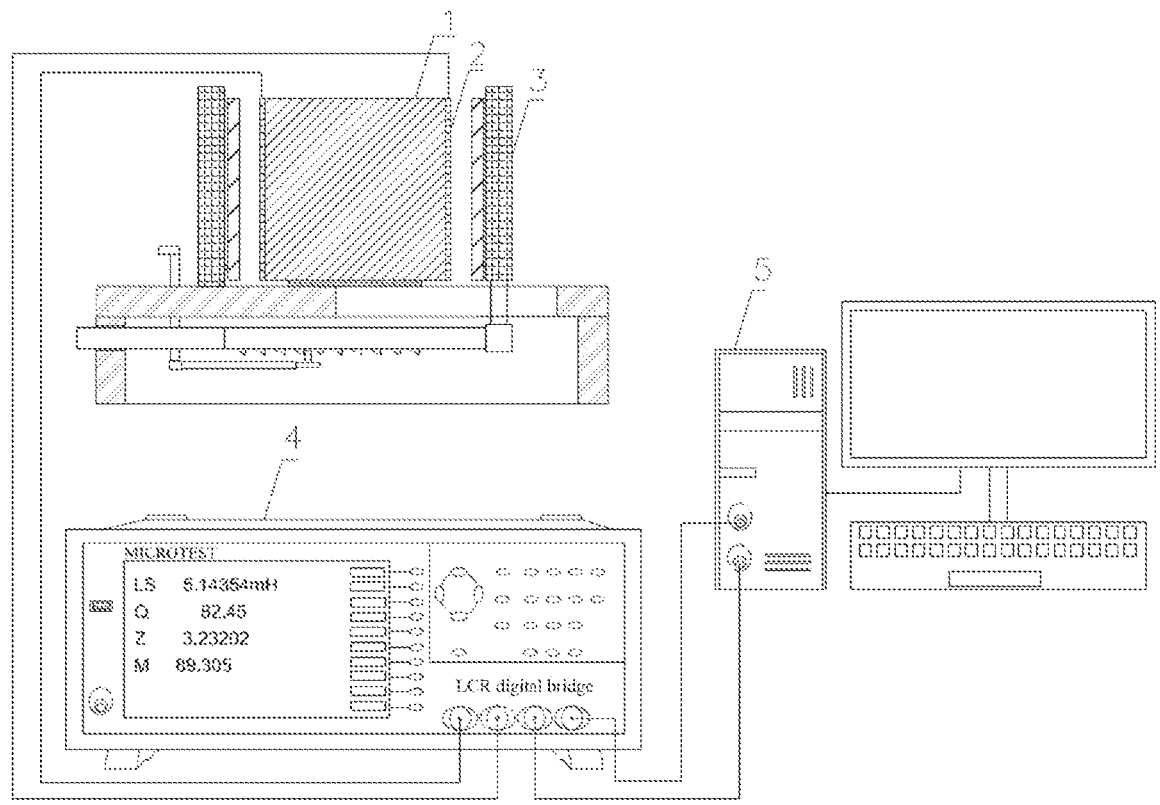
FIG. 3 is a schematic diagram of a micro-resistivity scanning test system structure according to an Embodiment 1 of the present disclosure.

As shown in FIG. 3, the micro-resistivity scanning imaging test system used in this embodiment includes a resistivity measuring component and an electro-imaging processing component 5 that are in a communication connection. The resistivity measuring component is configured to measures the resistivity of two opposite surfaces of the rock specimen 1 to obtain resistivity data. The electro-imaging processing component 5 is configured to: image the resistivity data to obtain an electro-imaging image, and perform image pre-processing and crack information extraction on the electro-imaging image to obtain crack information.

Figure 4:
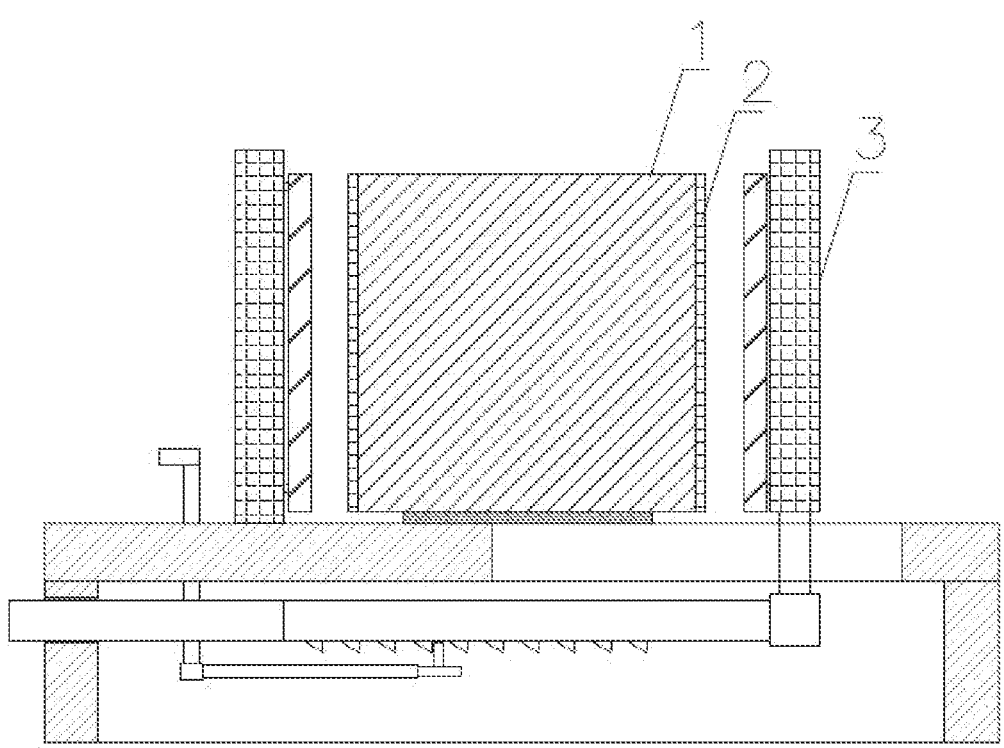
FIG. 4 is a schematic diagram of a fixing device structure according to an Embodiment 1 of the present disclosure.
Figure 5:
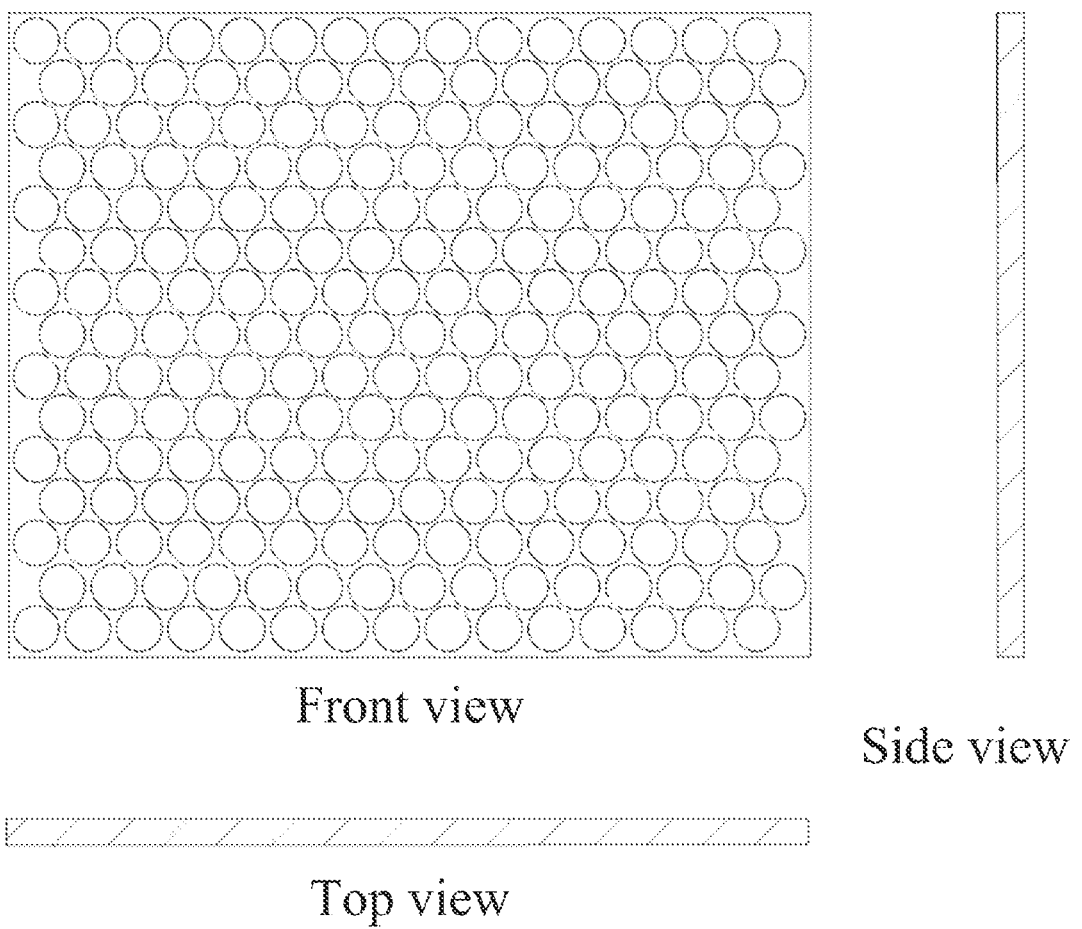
FIG. 5 is a schematic diagram of distribution of electrical buckles on a polar plate according to an Embodiment 1 of the present disclosure.

Specifically, as shown in FIG. 4, the resistivity measuring component includes an inductance, resistance, and capacitance (LCR) digital bridge tester 4, a fixing device 3, and two polar plates 2. The polar plates 2 are made of insulating material, and are used to fix electrical buckles and calibrate their positions. A plurality of electrical buckles is disposed on a first side surface of each polar plate 2. The electrical buckle may be an annular electrical buckle with a diameter of 5 mm. For a design of the polar plate 2 and an arrangement of the electrical buckles, in this embodiment, when the polar plate 2 is designed, dimensions of the rock specimen 1 (a rock to be tested) and the electrical buckles are fully considered, so that an insulation problem of the electrical buckles is resolved, and an area of the polar plate 2 is maximized. Therefore, grooves may be closely disposed on the first side surface of the polar plate 2 and configured to place the electrical buckles, that is, a plurality of rows of grooves without a gap are disposed on the first side surface of the polar plate 2, the electrical buckles without a gap are disposed in each row of grooves, and the electrical buckles in two adjacent rows of grooves are disposed in a staggered manner. Specifically, as shown in FIG. 5, based on the dimensions of the rock specimen 1 (the rock to be tested) and the electrical buckles, and by considering the insulation problem of the electrical buckles, 15 closely spaced rows of grooves are disposed on the first side surface of each polar plate 2, 15 electrical buckles are disposed in each row of grooves, and electrical buckles in rows are disposed in the staggered manner, to maximize an area of each polar plate 2, so that more electrical buckles are disposed as much as possible on the first side surface of each polar plate 2.

In a measuring state, that is, before a resistivity test is performed, the specimen is soaked first. The rock specimen 1 (the rock to be tested) is soaked in saturated brine until the rock specimen 1 is fully saturated, such that the brine permeates into the rock specimen 1 (the rock to be tested). The brine is used as an electrolyte in the resistivity test. Then, the two polar plates 2 and the rock specimen 1 (the rock to be tested) are placed on the fixing device 3. A first side surface of one polar plate 2 is attached to a first surface of the rock specimen 1 (the rock to be tested), and a first side surface of the other polar plate 2 is attached to a second surface of the rock specimen 1. The first surface and the second surface are two opposite surfaces of the rock specimen 1. The fixing device 3 is configured to apply a uniform pressure to the two polar plates 2, so that electrical buckles on the polar plates 2 are closely attached to the first surface and the second surface, that is, in close contact with the two opposite surfaces (opposites) of the rock specimen 1 (the rock to be tested). The LCR digital bridge tester 4 is electrically connected to each electrical buckle, and each electrical buckle is connected to the LCR digital bridge tester 4 via a conductor, to ensure that the LCR digital bridge tester 4 can accurately identify an electrical signal of each electrical buckle. The LCR digital bridge tester 4 is configured to measure an average resistance of the two opposite surfaces, and then perform conversion to obtain resistivity of an area where each electrical buckle is located. Thus, the resistivity data is obtained.

The LCR digital bridge tester 4 is connected to a matched electro-imaging processing component 5. The electro-imaging processing component 5 is configured to: record the resistivity data of each part of the rock specimen 1 (the rock to be tested) during the test, convert the resistivity data into the electro-imaging image, and perform image preprocessing and crack information extraction on the electro-imaging image, to obtain the crack information.

Specifically, obtaining an electro-imaging image from the resistivity data includes: performing chromaticity calibration on the resistivity data to obtain a spatial color value; arranging the spatial color value based on positions of the electrical buckles to obtain the electro-imaging image. After the chromaticity calibration, the resistivity data are mapped to generate a chromatographic image, which is used to obtain a color matrix of each part of the rock specimen 1 (the rock to be tested). Then, based on positions of electrical buckles on each polar plate 2, the color matrix is drawn and displayed on a computer screen according to an azimuth position, finally obtaining a visually intuitive electro-imaging image.

A chromaticity calibration process includes: determining a maximum value and a minimum value of resistivity data obtained by measurement, and recording the values as $E_{max}$ and $E_{min}$ respectively; determining a maximum value and a minimum value of red, green, and blue (RGB) color space as $K_{max}$ and $K_{min}$ respectively, and establishing a relationship between the RGB color space and the resistivity data through two intermediate transfer parameters M and $E_{offset}$, that is, determining values of the intermediate transfer parameters M and $E_{offset}$ in a formula $K_j = E_i \times M + E_{offset}$ so that $E_{min}$ can be changed into $K_{min}$ through the formula, and $E_{max}$ can be changed into $K_{max}$ through the formula, where $K_j$ represents spatial color value corresponding to each resistivity value, and $E_i$ represents a measured resistivity value of each electrical buckle. Then, the measured resistivity of each electrical buckle is converted into a color value corresponding to the color space through the formula.

The process of performing image preprocessing and crack information extraction on the electro-imaging image, to obtain the crack information includes the following steps:

(1) Perform graying, image enhancement, image denoising, image segmentation, and image filtering on the electro-imaging image, to obtain a filtered binary image; perform image thinning on the filtered binary image, to obtain a preprocessed image.

The graying may include the following steps. 1) Perform image graying: Perform hue, saturation, and value (HSV) color change, that is, convert the electro-imaging image into HSV color space, and extract an image of a brightness channel (that is, a V channel) as a grayscale image. 2) Perform grayscale transformation: Stretch an azimuth of a gray level value in the grayscale image to a whole gray level of 0 to 255 by a linear transformation method of the gray level value, to obtain a grayed image.

A formula used for the linear transformation of the gray level value is:

$$g(x, y) = \frac{255 - 0}{f(x, y)_{max} - f(x, y)_{min}} \cdot [f(x, y) - f(x, y)_{min}],$$

where $g(x,y)$ represents a gray level value of the grayed image obtained by linear transformation at coordinates $(x,y)$; $f(x,y)_{max}$ represents a maximum gray level value of the grayscale image before linear transformation; $f(x,y)_{min}$ represents a minimum gray level value of the grayscale image before linear transformation; $f(x,y)$ represents a gray level value in the grayscale image at the coordinates $(x,y)$ before linear transformation.

The image enhancement may include: enabling a gray level of the grayed image to be evenly distributed within a whole gray level orientation by an enhancement method based on histogram equalization, to obtain an enhanced image. This improves contrast of the image, so that the crack information is more prominent, more details are shown in comparison with an original image with linear scales, and the whole image is softer.

The image denoising may include: The crack information needs to be extracted when the image is segmented in a later stage, so that edge information of the image needs to be kept as much as possible in a denoising process. Therefore, denoising is performed on the enhanced image by a median filtering method, to obtain a denoised image.

The image segmentation may include: segmenting the denoised image by an Otsu optimal global threshold method, removing background information of the image, and highlighting the crack information, to obtain a preliminary binary image.

The image filtering may include: for the initial binary image, removing a background noise of the image by using a small area removal algorithm, and removing a noise in the crack by using a small hole removal algorithm, to obtain the filtered binary image.

The image thinning may include: performing morphological expansion processing, extracting a skeleton, and removing a burr. The performing image thinning on the filtered binary image, to obtain a preprocessed image may include: firstly, performing morphological expansion processing on the filtered binary image to obtain an expanded image; extracting a crack skeleton from the expanded image by using a Zhang-Suen algorithm (also referred to a Zhang-fast parallel algorithm), to obtain a crack skeleton image; finally, removing a burr on the crack skeleton in the crack skeleton image, to obtain the preprocessed image.

The removal of a burr on the crack skeleton may involve the following steps:

1) Perform statistical analysis of nodes and endpoints in the crack skeleton image: Traverse each pixel in the crack skeleton diagram by using a 3×3 sliding window. Consider the current pixel as a center point of the sliding window and count the quantity of total pixels within the sliding window; if the total quantity is 2, regard the current pixel as the endpoint; if the total quantity is 3, regard the current pixel as an ordinary point, which is neither an endpoint nor a node; if the total quantity is greater than or equal to 4, regard the current pixel as a node.

2) Starting from each endpoint, calculate a length from the current pixel to each node, to obtain a length of a branch chain.

3) Judge the length of the branch chain and remove a branch chain with a small length as a burr. If the length of the branch chain is less than a specific preset length, consider it as a small-length branch chain.

(2) Determine the position, the quantity, and an area of the crack based on the filtered binary image; determine the trend and the length of the crack based on the preprocessed image; calculate the width of the crack based on the area and the length to obtain the crack information.

The determination of the position, the quantity, and an area of the crack based on the filtered binary image may include: directly observing the filtered binary image to determine the position of the crack; calculating a connected domain of the filtered binary image to obtain the quantity and the area of the crack; calculating the filtered binary image by using a 8-connected-mode connected domain algorithm and counting a quantity of connected domains in the image using a statistical method, to obtain the quantity of cracks; calculating an area of each connected domain to obtain an area of each crack. The specific calculation method includes: first, processing the filtered binary image by using the connected domain algorithm (cv2. connected components), where an 8-connected search method is included; marking different connected domains with different numbers in ascending order (starting from 1), where the obtained largest marked number is the quantity of cracks, and a total quantity of pixels corresponding to each assigned number is the area of each crack.

The determination of the trend and the length of the crack based on the preprocessed image may include: for each crack in the preprocessed image, generating eight-direction Freeman chain code for the crack to obtain a Freeman chain code value of each pixel within the crack; determining the trend and the length of the crack based on the Freeman chain code value of each pixel, that is, processing the Freeman chain code value to obtain information about a trend and a length of each crack.

The process of writing the eight-direction Freeman chain code by using an 8-direction search method specifically involves searching within a sliding window of size 3×3 pixels and a center of a selected point, and selecting eight neighborhood pixels around the selected point within the search range, to obtain a Freeman chain code value for each pixel.

Figure 6:
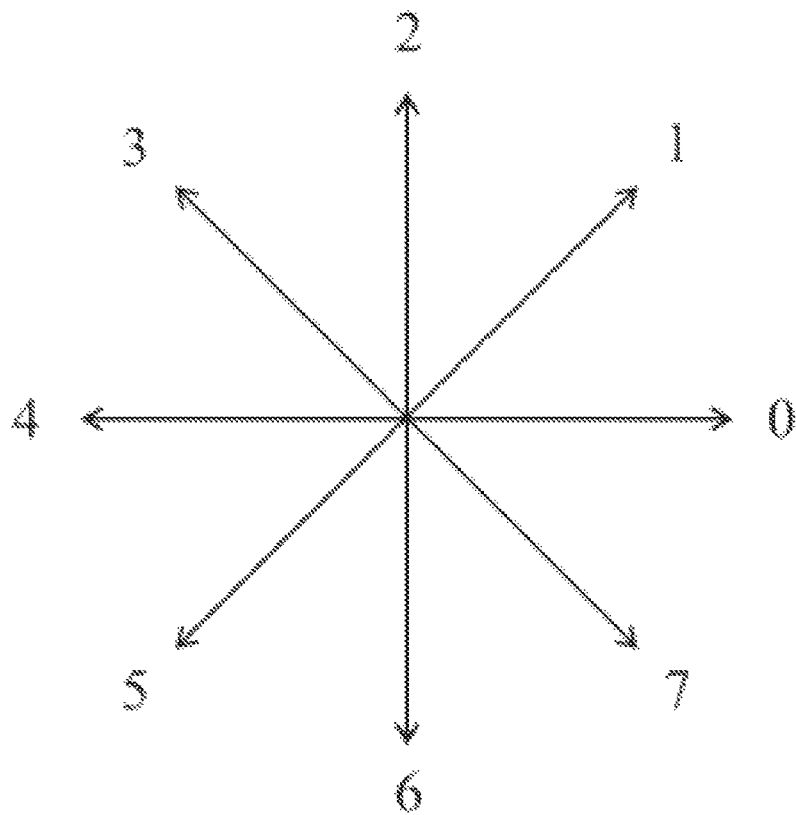
FIG. 6 is a schematic diagram of a Freeman chain code value according to an Embodiment 1 of the present disclosure.

Specifically, a method of obtaining the trend of the crack includes: obtaining trend information of the crack from the Freeman chain code value. When the Freeman chain code value is odd, it means that the trend is in a 45° inclined direction, and when the Freeman chain code value is even, it means that the trend is horizontal or vertical. As shown in FIG. 6, different chain code values 1, 2, 3, 4, 5, 6, 7, and 0 correspond to different eight directions (0°, 45°, 90°, 135°, 180°, 225°, 270°, 315°, and 360°) of the trend of the crack can be obtained from the Freeman chain code values. It should be noted that there may be an error between an actual trend of the crack and a calculated value. For example, when the trend is between 0° and 45°, a maximum deviation is 22.5°, and when an actual width of the crack is 100, a calculated width of the crack is 100/cos (22.5°)=108.24, which is close to the actual width of the crack. Therefore, such deviation can be ignored.

A method of obtaining the length of the crack includes: For each crack, a calculation formula of the length of the crack is:

$$L=W_o N_o + W_e N_e$$

where L represents a length of a crack in the rock specimen 1 (the rock to be tested); $W_o$ represents a weight when the Freeman chain code value is even; $N_o$ represents a quantity of cracks when the Freeman chain code value is even; $W_e$ represents a weight when the Freeman chain code value is odd; $N_e$ represents a quantity of cracks when the Freeman chain code value is odd.

The length of each crack can be separately calculated by using the following formula. Since crack formed by hydraulic fracturing is tortuous, the length cracks in a horizontal direction and a vertical direction (that is, the chain code value is even) and a 45° direction (that is, the chain code value is odd) can be separately calculated, and then summed up. Each crack includes a plurality of areas with a size of 3×3 pixels, and the length of each crack is a sum of lengths of cracks in these areas.

After obtaining the length and area of the crack, a formula for calculating the width of the crack is as follows:

$$b_a = \frac{S}{L},$$

where $b_a$ represents the width of the crack, S represents the area of the cracks, and L represents the length of the crack.

The preprocessed image can be obtained by following the image preprocessing steps of graying, image enhancement, image denoising, image segmentation, and image filtering, and image thinning. During the pretreatment process, parameters of the cracks can be extracted. Finally, the quantity of cracks and the position, the trend, the length, and the width of each crack can be determined to obtain the crack information. The crack information is presented in a form of two-dimensional cross-sectional image.

Based on the micro-resistivity scanning imaging test system described above, the process of performing a micro-resistivity scanning imaging test on the rock specimen 1 by using a micro-resistivity scanning imaging test system, to obtain a two-dimensional micro-resistivity distribution image of the rock specimen 1 for training may include the following steps:

The following operations may be performed for any two opposite surfaces of the rock specimen 1.

(1) Before performing a fracturing test on the rock specimen 1, start by soak the rock specimen 1 in the saturated brine until the rock specimen 1 is fully saturated, allowing the brine to permeate into the rock. The brine serves as an electrolyte for the resistivity test.

Next, use the resistivity measuring component to measure the resistivity of the two opposite surfaces and obtain pre-fracturing resistivity data. Finally, process the pre-fracturing resistivity data by using the electro-imaging processing component 5 to obtain pre-fracturing crack information.

(2) After performing the fracturing test on the rock specimen 1, start by soak the rock specimen 1 in the saturated brine until the rock specimen 1 is fully saturated, allowing the brine to permeate into the rock. The brine serves as the electrolyte for the resistivity test. Next, use the resistivity measuring component to measure the resistivity of the two opposite surfaces and obtain post-fracturing resistivity data. Finally, process the post-fracturing resistivity data by using the electro-imaging processing component 5, to obtain post-fracturing crack information.

(3) Subtract the pre-fracturing crack information from the post-fracturing crack information to obtain crack information corresponding to the two opposite surfaces. Combine the crack information corresponding to both opposite surfaces of the rock specimen 1 to form the two-dimensional micro-resistivity distribution image for training.

A cube-shaped rock specimen 1 is used as an example. In this embodiment, the rock specimen 1 needs to be tested before and after the fracturing test, and three groups of opposites (two opposite surfaces) of the rock specimen 1 need to be tested in each test. By comparing two-dimensional micro-resistivity section images of the rock specimen 1 before and after the fracturing test, the crack information of the two-dimensional image of the rock specimen 1 formed during fracturing test can be obtained. The crack information of each group of opposites can form a two-dimensional image, and all two-dimensional images form the two-dimensional micro-resistivity distribution image for training.

Testing and imaging processing are separately performed, by using the micro-resistivity scanning imaging test system, on the rock specimen 1 before and after the fracturing test, to obtain the crack information of the rock specimen 1 before and after the fracturing test. Through comparative analysis, the crack information of the rock specimen 1 after the fracturing test is subtracted from the crack information of the rock before the fracturing test, to obtain information of a crack in the rock specimen 1 formed during the fracturing test, that is, the two-dimensional micro-resistivity distribution image for training.

In S2, the CT scanning test is performed on the rock specimen 1 to obtain the three-dimensional CT scanning image of the rock specimen 1. The three-dimensional CT scanning image of the rock specimen 1 can be obtained through the CT scanning test. The CT scanning test is performed to obtain the three-dimensional CT scanning images of the rock specimen 1 before and after the fracturing test. By comparing the information of the three-dimensional CT scanning images obtained in the two tests, accurate crack information formed in the fracturing test of the rock specimen 1 can be obtained, that is, the three-dimensional CT scanning image for training. The accurate crack information in the rock specimen 1 (including a position, a quantity, a trend, a length, and a width of the crack) is presented in a form of the three-dimensional image.

S3: Train an initial variational autoencoder by using two-dimensional micro-resistivity distribution images and three-dimensional CT scanning images of all rock specimens as inputs to obtain a trained variational autoencoder.

Figure 7:
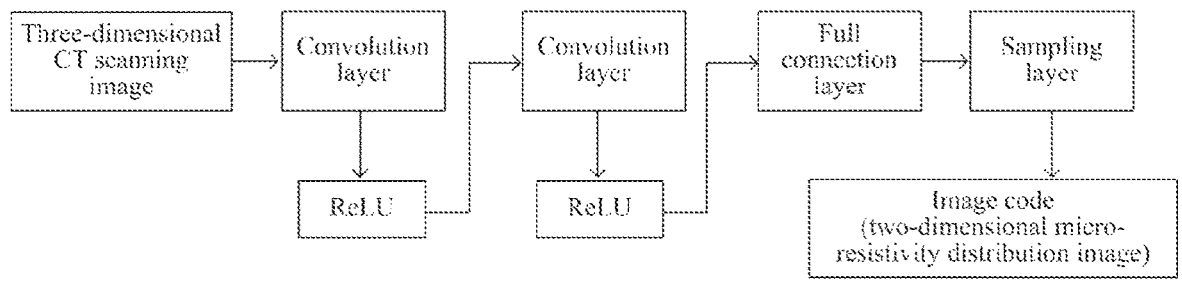
FIG. 7 is a schematic diagram of a neural network structure of an encoder according to an Embodiment 1 of the present disclosure.
Figure 8:
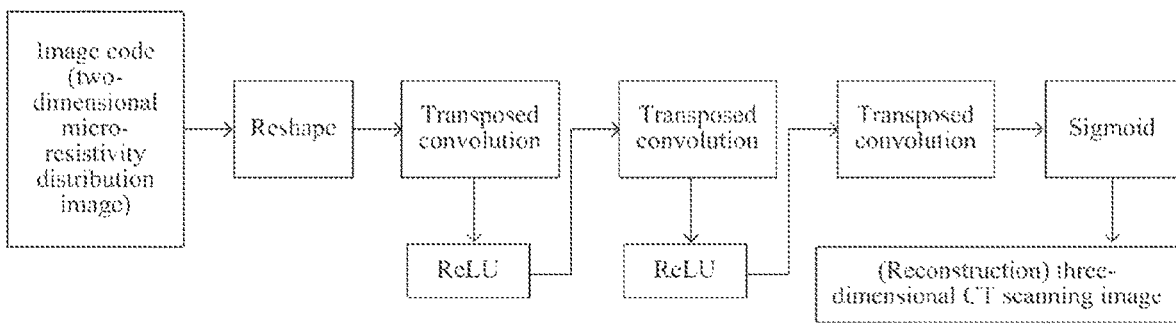
FIG. 8 is a schematic diagram of a neural network structure of a decoder according to an Embodiment 1 of the present disclosure.

As shown in FIG. 7 and FIG. 8, a deep learning variational autoencoder is configured to establish a mapping relationship between the two-dimensional micro-resistivity distribution image and the three-dimensional CT scanning image. It consists of two parts: a neural network structure of an encoder and a neural network structure of a decoder. The neural network structure of the encoder can process the three-dimensional CT scanning image to obtain the two-dimensional micro-resistivity distribution image. The neural network structure of the decoder can process the two-dimensional micro-resistivity distribution image to obtain the three-dimensional CT scanning image.

In this embodiment, the essence of the variational autoencoder (VAE) based on a deep learning algorithm is to establish the mapping relationship between the two-dimensional micro-resistivity distribution image and the three-dimensional CT scanning image (spatial distribution of rock cracks). The variational autoencoder is a generator model based on representation learning. A difference from a traditional autoencoder lies in that the variational autoencoder adds probability distribution to hidden space, and then learns this distribution, ensuring that the output distribution of the decoder to be consistent with the observed data.

During the training process, the two-dimensional micro-resistivity distribution can be obtained by importing the three-dimensional CT scanning image into the neural network structure of the encoder, and the three-dimensional CT scanning image can be reconstructed by importing the two-dimensional micro-resistivity distribution image into the neural network structure of the decoder. The variational autoencoder can add the probability distribution of the crack information to the hidden space, and then learn this distribution, to enable output distribution of the decoder to be consistent with the observed data. Specifically, a hidden space output vector is obtained by sampling from learned the distribution of the encoder. The input data of the variational autoencoder is obtained by sampling from a distribution that represents the actual crack information (specifically embodied as 2D micro-resistivity imaging). The encoder and decoder are obtained by jointly training to minimize a reconstruction error. A measurement of the reconstruction error is Kullback-Leibler (KL) divergence between the parameter posterior distribution and true posterior distribution.

S4: Perform the micro-resistivity scanning imaging test on a rock to be tested by using the micro-resistivity scanning imaging test system to obtain a two-dimensional micro-resistivity distribution image of the rock to be tested; use the two-dimensional micro-resistivity distribution image as an input and use the trained variational autoencoder to reconstruct the three-dimensional CT scanning image; determine the crack information of the rock to be tested based on the three-dimensional CT scanning image, including a position, a quantity, a trend, a length, and a width of a crack.

The process of performing the micro-resistivity scanning imaging test on the rock to be tested, by using the micro-resistivity scanning imaging test system, to obtain a two-dimensional micro-resistivity distribution image of the rock to be tested in S4, is the same as the process of performing a micro-resistivity scanning imaging test on the rock specimen 1, by using a micro-resistivity scanning imaging test system, to obtain a two-dimensional micro-resistivity distribution image of the rock specimen 1 in S2, which needs to replace the rock specimen 1 in S2 with the rock to be tested. Details are not described herein again.

According to the identification method for obtaining accurate crack information of the rock based on the micro-resistivity scanning imaging technology and the deep learning variational autoencoder, the two-dimensional micro-resistivity distribution image and the three-dimensional CT scanning image of the rock specimen 1 are obtained by performing the micro-resistivity scanning imaging test and the CT scanning test, and the mapping relationship between the two-dimensional micro-resistivity distribution image and the three-dimensional CT scanning image established by the deep learning variational autoencoder is used to detect crack information of the rock formed after the fracturing test, to provide a new accurate drawing method of the crack information for the rock fracturing test. Compared with an acoustic emission technology, the crack can be more accurately identified, the spatial position, the quantity, the trend, the length, and the width of the crack can be accurately described. Compared with a CT scanning technology, budgets are small, and operations are simple.

Embodiment 2

Figure 9:
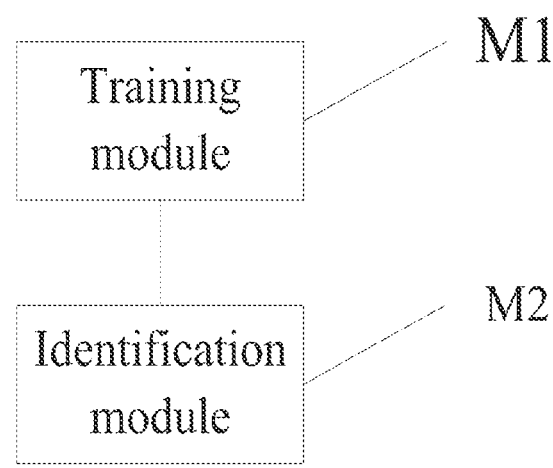
FIG. 9 is a block diagram of an identification system according to an Embodiment 2 of the present disclosure.

A rock crack information identification system based on a variational autoencoder is provided in this embodiment. As shown in FIG. 9, the identification system includes a training module M1 and an identification module M2.

The training module M1 is configured to: obtain a plurality of rock specimens; for each rock specimen, perform a micro-resistivity scanning imaging test on the rock specimen by using a micro-resistivity scanning imaging test system, to obtain a two-dimensional micro-resistivity distribution image of the rock specimen for training; perform a computed tomography (CT) scanning test on the rock specimen, to obtain a three-dimensional CT scanning image of the rock specimen for training; use two-dimensional micro-resistivity distribution images and three-dimensional CT scanning images of all rock specimens as inputs to train an initial variational autoencoder, to obtain a trained variational autoencoder.

The identification module M2 is configured to: perform the micro-resistivity scanning imaging test on a rock to be tested, by using the micro-resistivity scanning imaging test system, to obtain a two-dimensional micro-resistivity distribution image of the rock to be tested; use the two-dimensional micro-resistivity distribution image as an input and the trained variational autoencoder to reconstruct the three-dimensional CT scanning image; determine the crack information of the rock to be tested based on the three-dimensional CT scanning image, including a position, a quantity, a trend, a length, and a width of a crack.

All embodiments in this specification focus on the differences from other embodiments. The same or similar portions of these embodiments may refer to one another. Since the system disclosed in an embodiment corresponds to the method disclosed in another embodiment, the description is relatively simple, and reference can be made to the method description.

Specific examples are used herein to explain the principles and implementations of the present disclosure. The foregoing description of the embodiments is only intended to help understand the method of the present disclosure and its core ideas. Besides, various modifications may be made by those of ordinary skill in the art to specific implementations and the scope of application in accordance with the ideas of the present disclosure. In conclusion, the content of the present specification shall not be construed as limitations to the present disclosure.

What is claimed is:

1. A rock crack information identification method based on a variational autoencoder, comprising:
    obtaining a plurality of rock specimens;
    performing a micro-resistivity scanning imaging test on each rock specimen, by using a micro-resistivity scanning imaging test system, to obtain a two-dimensional micro-resistivity distribution image of the rock specimen for training;
    performing a computed tomography (CT) scanning test on each rock specimen, to obtain a three-dimensional CT scanning image of the rock specimen for training;
    training an initial variational autoencoder by using two-dimensional micro-resistivity distribution images and three-dimensional CT scanning images of all rock specimens as inputs, to obtain a trained variational autoencoder; and
    performing the micro-resistivity scanning imaging test on a rock to be tested, by using the micro-resistivity scanning imaging test system to obtain a two-dimensional micro-resistivity distribution image of the rock to be tested; reconstructing the three-dimensional CT scanning image by the trained variational autoencoder by using the two-dimensional micro-resistivity distribution image as an input; and determining, based on the three-dimensional CT scanning image, crack information of the rock to be tested, wherein the crack information comprises a position, a quantity, a trend, a length, and a width of a crack.

2. The identification method according to claim 1, wherein the micro-resistivity scanning imaging test system comprises a resistivity measuring component and an electro-imaging processing component that are in a communication connection; and
    the resistivity measuring component is configured to measure resistivity of two opposite surfaces of the rock specimen, to obtain resistivity data; and the electro-imaging processing component is configured to: convert the resistivity data into an electro-imaging image, and perform image preprocessing and crack information extraction on the electro-imaging image to obtain the crack information.

3. The identification method according to claim 2, wherein the resistivity measuring component comprises an inductance, resistance, and capacitance (LCR) digital bridge tester, a fixing device, and two polar plates; and a plurality of electrical buckles are disposed on a first side surface of each polar plate; and
    in a measuring state, the first side surface of one polar plate is attached to a first surface of the rock specimen, and the first side surface of the other polar plate is attached to a second surface of the rock specimen; the first surface and the second surface are the two opposite surfaces of the rock specimen; the fixing device is configured to apply a pressure to the two polar plates, to enable the electrical buckle to be closely attached to the first surface and the second surface; and the LCR digital bridge tester is electrically connected to each of the electrical buckles, and the LCR digital bridge tester is configured to measure and obtain the resistivity data.

4. The identification method according to claim 3, wherein a plurality of rows of grooves without a gap are disposed on the first side surface of the polar plate, the plurality of electrical buckles without a gap are disposed in each row of the grooves, and the electrical buckles in two adjacent rows of the grooves are disposed in a staggered manner.

5. The identification method according to claim 3, wherein the imaging the resistivity data to obtain an electro-imaging image specifically comprises: performing chromaticity calibration on the resistivity data, to obtain a spatial color value; and arranging the spatial color value based on positions of the electrical buckles, to obtain the electro-imaging image.

6. The identification method according to claim 2, wherein the performing image preprocessing and crack information extraction on the electro-imaging image, to obtain the crack information specifically comprises:
 performing graying, image enhancement, image denoising, image segmentation, and image filtering on the electro-imaging image, to obtain a filtered binary image; and performing image thinning on the filtered binary image, to obtain a preprocessed image; and
 determining the position, the quantity, and an area of the crack based on the filtered binary image, and determining the trend and the length of the crack based on the preprocessed image; and calculating the width of the crack based on the area and the length, to obtain the crack information.

7. The identification method according to claim 6, wherein the performing image thinning on the filtered binary image, to obtain a preprocessed image comprises:
 performing morphological expansion processing on the filtered binary image, to obtain an expanded image; and
 extracting a crack skeleton from the expanded image by using a Zhang-Suen algorithm, and removing a burr on the crack skeleton, to obtain the preprocessed image.

8. The identification method according to claim 6, wherein the determining the trend and the length of the crack based on the preprocessed image specifically comprises:
 for each crack in the preprocessed image, writing eight-direction Freeman chain code for the crack, to obtain a Freeman chain code value of each pixel comprised in the crack; and determining the trend and the length of the crack based on the Freeman chain code value of each pixel.

9. The identification method according to claim 2, wherein the performing a micro-resistivity scanning imaging test on the rock specimen by using a micro-resistivity scanning imaging test system, to obtain a two-dimensional micro-resistivity distribution image of the rock specimen for training specifically comprises:
 performing the following operations for any two opposite surfaces of the rock specimen:
  before performing a fracturing test on the rock specimen, soaking the rock specimen in saturated brine until the rock specimen is fully saturated, and measuring the resistivity of the two opposite surfaces by using the resistivity measuring component, to obtain pre-fracturing resistivity data; and processing the pre-fracturing resistivity data by using the electro-imaging processing component, to obtain pre-fracturing crack information;
  after performing the fracturing test on the rock specimen, soaking the rock specimen in the saturated brine until the rock specimen is fully saturated, and measuring the resistivity of the two opposite surfaces by using the resistivity measuring component, to obtain post-fracturing resistivity data; and processing the post-fracturing resistivity data by using the electro-imaging processing component, to obtain post-fracturing crack information; and
  subtracting the pre-fracturing crack information from the post-fracturing crack information, to obtain crack information corresponding to the two opposite surfaces; and forming, with the crack information corresponding to all the two opposite surfaces of the rock specimen, the two-dimensional micro-resistivity distribution image.

10. A rock crack information identification system based on a variational autoencoder, comprising: a training module, configured to: obtain a plurality of rock specimens; for each rock specimen, perform a micro-resistivity scanning imaging test on the rock specimen by using a micro-resistivity scanning imaging test system, to obtain a two-dimensional micro-resistivity distribution image of the rock specimen for training; perform a computed tomography (CT) scanning test on the rock specimen, to obtain a three-dimensional CT scanning image of the rock specimen for training; and train an initial variational autoencoder by using two-dimensional micro-resistivity distribution images and three-dimensional CT scanning images of all rock specimens as inputs, to obtain a trained variational autoencoder; and an identification module, configured to: perform the micro-resistivity scanning imaging test on a rock to be tested, by using the micro-resistivity scanning imaging test system, to obtain a two-dimensional micro-resistivity distribution image of the rock to be tested; reconstruct the three-dimensional CT scanning image by the trained variational autoencoder by using the two-dimensional micro-resistivity distribution image as an input; and determine, based on the three-dimensional CT scanning image, crack information of the rock to be tested, wherein the crack information comprises a position, a quantity, a trend, a length, and a width of a crack, wherein the training module and the identification module is a processor.

* * * * *